Dec. 23, 1969     K. W. KINGSLEY     3,485,938

ELECTRIC CABLE WITH ADHERED POLYMERIC INSULATION

Filed April 24, 1968

KENYON W. KINGSLEY
INVENTOR

BY

AGENT

United States Patent Office 3,485,938
Patented Dec. 23, 1969

3,485,938
ELECTRIC CABLE WITH ADHERED
POLYMERIC INSULATION
Kenyon W. Kingsley, Butler, N.J., assignor to The
Okonite Company, Passaic, N.J., a corporation of
Delaware
Filed Apr. 24, 1968, Ser. No. 723,842
Int. Cl. H01b 7/18, 7/28
U.S. Cl. 174—107                                    6 Claims

ABSTRACT OF THE DISCLOSURE

Disclosed is an adhesive composition which adherently bonds a polymeric insulation material comprising a terpolymer of ethylene, propylene, and a diene to an electrical conductor or to a metal cable shield.

---

This invention relates to electrical cable, and more particularly, to polymerically insulated cable capable of withstanding severe service environments and methods of making the same.

Electrical cable which can withstand severe operating conditions is sought for many applications. One such application is use in an oil well where the cable must be resistant to the various substances found there, such as aliphatic and aromatic hydrocarbons, brine, carbon dioxide, and hydrogen sulfide. Moreover, the cable must withstand the effects of the corrosive agents for long periods of time at elevated temperature, as high for example, as 250 to 350° F.

Many polymeric materials have been suggested for insulating electrical cable from extremely severe service conditions. One such material is a terpolymer of ethylene, propylene, and a diene. Heretofore, however, it has not been possible to adherently bond this polymeric material to an electrical conductor or to a metal shield.

In co-pending application Ser. No. 723,841 filed concurrently herewith, there is described and claimed a novel two-adhesive system for adherently bonding a terpolymer of ethylene, propylene and a diene to an electrical conductor or a metal cable shield. The use of two layers of adhesive is inconvenient, however, because of the additional handling operations involved. Clearly, a one-coat adhesive would be more desirable.

Accordingly, it is a principal object of the invention to provide an electrical cable having insulation comprising a terpolymer of ethylene, propylene and a diene adherently bonded to an electrical conductor or a metal cable shield by a single layer of adhesive.

Another object of the invention is to provide a method of adherently bonding a terpolymer of ethylene, propylene and a diene to an electrical conductor or a metal cable shield with a one-coat adhesive.

A further object of the present invention is to provide an improved polymerically insulated cable capable of withstanding severe operating conditions.

Other objects, features, and advantages of the invention will be apparent from the following detailed description when taken together with the appended claims and accompanying drawing illustrative of the invention wherein:

Figure 3:
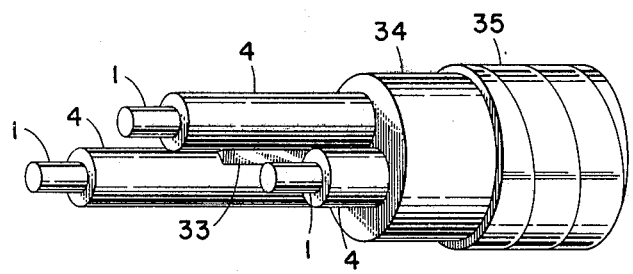
Figure 4:
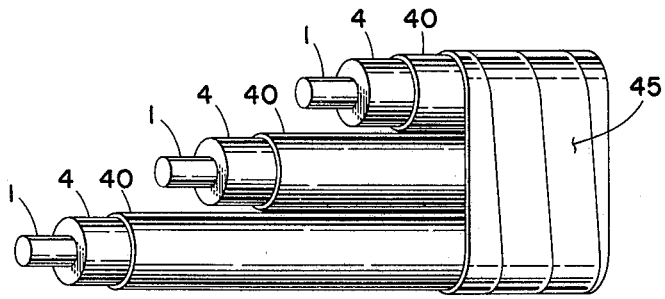

FIGURE 3 is a fragmentary perspective view of a round multiconductor cable employing three of the electrical cables constructed in accordance with the invention, with some of the successive strata around the conductor partly removed in order to show their relationship to each other, and FIGURE 4 is a fragmentary perspective view of a flat, parallel multi-conductor cable employing three of the electrical cables constructed in accordance with the invention, with some of the successive strata around the conductor partly removed in order to show their relationship to each other.

Throughout the various figures, like elements are designated by the same reference numerals.

The diene of the terpolymer employed in the present invention is a non-conjugated diene capable of polymerizing with ethylene and propylene, and which, upon polymerization, is appendant on the ethylene-propylene main chain. Typically, the diene comprises less than ten weight percent of the terpolymer, the remainder consisting of ethylene and propylene in the weight percentage ratio of ethylene to propylene of approximately 3:2. Examples of suitable dienes are 1,4 hexadiene, dicyclopentadiene, and ethylidene norbornene. When used hereinafter, the term "ethylene-propylene-diene terpolymer" refers to a terpolymer of ethylene, propylene and a diene such as specified above.

There are a number of commercially available adhesives which might be considered for adhering an ethylene-propylene-diene terpolymer to a metal. The present inventor has found that genreally these adhesives are either adherent to the metal of the electrical conductor (metal adhesives) or adherent to the polymer (polymer adhesives). As further found by the inventor, combinations of adhesives do not necessarily produce an adherent bond. For purposes of this invention, an adherent bond is one which is stronger than the insulation material being bonded to the conductor. Thus, if the insulation is adherently bonded to the conductor, an effort to remove the insulation by stripping results entirely in the rupture of the insulation and not the adhesive bond. In accordance with the present invention, various adhesive elements, including a chlorinated rubber, a plasticizer, and an ethylene-propylene-diene terpolymer, are combined in specific proportions to produce a single adhesive which adherently bonds an ethylene-propylene-diene terpolymer to a metal.

Figure 1:
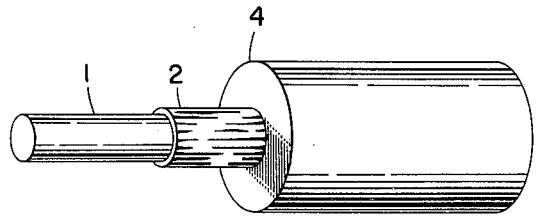
FIGURE 1 is a fragmentary perspective view of a section of an electrical cable constructed in accordance with the invention, with the successive strata around the conductor partly removed in order to show their relationship to each other.

Referring now to the drawing, FIG. 1 depicts a polymerically insulated electric cable comprising an electrical conductor 1, an adhesive material 2 covering the conductor and adherently bonded thereto, and polymeric insulation material 4 covering the adhesive material and adherently bonded thereto. The electrical conductor 1 is a single solid wire or a plurality of wires and consists of any suitable metal. It may consist of one of the common uncoated conductors such as aluminum or copper, or the conductor, for example copper, may be coated with lead, tin, silver, bronze, alloys of lead and tin, or alloys of lead, tin, bismuth and antimony. The adhesive material 2 consists essentially of a chlorinated rubber, an ethylene-propylene-diene terpolymer, a chlorinated triphenyl plasticizer, a peroxide curing agent, and finely divided carbon.

In order to produce an adherent, non-strippable bond, the non-volatile content of the adhesive composition must consist essentially of 1.6–5.2% by weight chlorinated rubber, 46–54% by weight ethylene-propylene-diene terpolymer, 13–19% by weight chlorinated triphenyl plasticizer, and may further comprise about 1.0% by weight dicumyl peroxide, the remainder being finely divided carbon, such as lamp black. The polymeric insulation material 4 comprises an ethylene-propylene-diene terpolymer. While virtually any material which comprises the terpolymer in substantial proportion may be used, in a preferred form the polymeric insulation further comprises a surface treated clay, an antioxidant, a stabilizer, a vulcanizing agent, and a curing agent. In a specific preferred embodiment, the ethylene-propylene-diene terpolymer is Nordel 1145 sold by the E. I. DuPont Co., the surface treated clay is calcined aluminum silicate, the antioxidant is polymerized trimethyl dihydroquinoline, the stabilizer is cadmium stearate, the vulcanizing agent is red lead oxide ($Pb_3O_4$), and the curing agent is dicumyl peroxide. As will be apparent to one skilled in the art, various other fillers and plasticizers may be added to the above composition to achieve the processing and physical characteristics desired.

Figure 2:
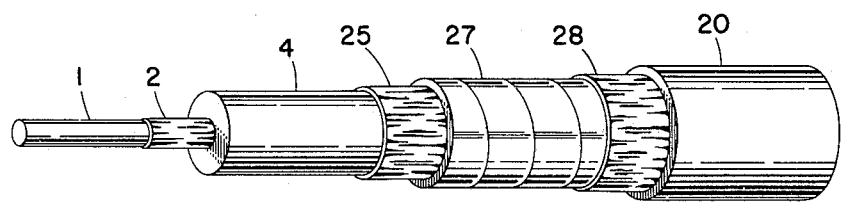
FIGURE 2 is a fragmentary perspective view of an electrical cable constructed in accordance with another embodiment of the invention, with the successive strata around the conductor partly removed in order to show their relationship to each other.

As will be seen from FIG. 2, the adhesive system described above is also useful for bonding metal components to the outer surface of the polymeric insulation 4, as well as further bonding elastomeric materials to the metal components. FIG. 2 depicts a polymerically insulated electric cable having the elements of the cable shown in FIG. 1 designated by the same reference numerals, and further comprising a layer 25 of the adhesive material covering the polymeric insulation material and adherently bonded thereto, a metal layer 27 covering the layer 25 and adherently bonded thereto, a layer 28 of the adhesive covering the metal layer 27 and adherently bonded thereto, and a protective layer 20 of an elastomeric material covering the layer 28 and adherently bonded thereto. The metal layer 27 may be of any suitable metal such as copper, commercial bronze or steel, consists of helically wrapped metal tape of either the flat or contoured interlocking type, wire braids, or wire servings, and serves as an electrostatic shield and as armor to protect the insulation from physical damage. The adhesive provides the added advantage of serving as a "shield screen" under the metal layer 27. A layer of the adhesive has the low DC resistivity required for dissipating electrical charges away from the interface of the insulation 4 and the metal layer 27. If a void develops between the metal and the insulation, the conductive adhesive dissipates the charges induced between the metal and the insulation thus avoiding corona discharge, which might damage the insulation 4. The layer 20, which serves as an over-all covering for the cable, may comprise any elastomer which, after vulcanization, strongly bonds to the adhesive. For example, the elastomer may be neoprene; a copolymer of butadiene and acrylonitrile; mixtures of polyacrylonitrile and polyvinylchloride; a terpolymer of ethylene, propylene, and a diene; mixtures of a terpolymer of ethylene, propylene and a diene plus a copolymer of butadiene and acrylonitrile; a copolymer of ethylene oxide and epichlorohydrin; or a mixture of a coplymer of ethylene oxide and epichlorohydrin and a copolymer of butadiene and acrylonitrile.

The method of producing the polymerically insulated electrical cable in accordance with the present invention is illustrated as follows. The adhesive is prepared by mixing 50 to 55% by weight of an ethylene-propylene-diene terpolymer having a Mooney viscosity of 40 after four minutes at 250° F., 14 to 19% by weight of a chlorinated triphenyl plasticizer, about 1% by weight of a peroxide curing agent and about 30% by weight finely divided carbon in an amount of a solvent, consisting of heptane and toluene in the volume ratio of 1.5:1, sufficient to produce a composition having 13–15% by weight solids. The composition is then diluted with toluene in the volume ratio 1:1 and an amount equal to 2.5 to 7.5% by weight of the composition of chlorinated rubber is added. The adhesive material is applied in a continuous manner to the conductor and dried. Thereafter, the coated conductor passes to conventional cross-head extrusion apparatus. The ethylene-propylene-diene polymeric insulation composition is introduced into the screw of the extruder on which the composition is heated and masticated. As the polymeric composition becomes plastic it is forced into a chamber or head fixed to the delivery end of the extruder at right angles to the screw. The head contains a guiding device for the conductor and a suitable forming die with a tapered, annular opening for forming the polymeric composition around and in intimate contact with the coated conductor. Preferably, a lubricating oil is applied over the adhesive coated conductor to facilitate passage of the conductor through the guiding device in the cross-head. The cross-head is in turn fixed to a high pressure steam tube containing steam maintained at 250 p.s.i. gauge pressure. The high temperature and pressure cause curing of the cable as it moves through the tube. Besides cross-linking the polymeric insulation, the combination of heat and pressure fluxes, fuses, and cross-links the various materials together. That is to say, the adhesive is bonded to the conductor and to the polymeric insulation.

To form the cable shown in FIG. 2, after adhesive layer 2 and insulation layer 4 have been applied to the conductor 1 as described above, a layer 25 of the adhesive is put on and dried. Thereafter, the metal layer 27 is applied in a conventional manner. The layer 28 is then put on and dried. The elastomeric covering 20 is applied thereover by the same extrusion and curing techniues as used for insulation layer 4, described above.

The following specific example will further serve to illustrate the principles of the present invention.

EXAMPLE

In making a polymerically insulated cable as illustrated in FIG. 1, the adhesive material was prepared by combining 52% of a terpolymer of ethylene, propylene, and ethylidene norbornene having a Mooney viscosity of 40 after four minutes at 250° F. 16% by weight of a chlorinated triphenyl plasticizer, 1% dicumyl peroxide curing agent and 31% by weight lamp black carbon filler. The components were combined on a two roll mill and dissolved in a 1.5:1 mixture of heptane and toluene to produce an adhesive composition having 14% solids. The hesive composition was then diluted in a 1:1 volume ratio with toluene, and an amount of chlorinated rubber having a viscosity of 19 centipoises and equal to 5% by weight of the non-volatile content of the composition was added. The electrical conductor in the form of a copper wire coated with an alloy of 98% lead and 2% tin was degreased with chloroethene. A thin coating of the adhesive material was then applied to the conductor and dried. A covering of a polymeric insulating material comprising an ethylene-propylene-diene terpolymer, specifically Nordel 1145; a surface treated clay, calcined aluminum silicate; an antioxidant, polymerized trimethylidhydroquinoline; a stabilizer, cadmium stearate; a vulcanizing agent, red lead oxide ($Pb_3O_4$); and a curing agent, dicumyl peroxide; was extruded over the surface of the coated conductor in a thickness of 65 mils and cured for two minutes at 400° F.

A round, multi-conductor cable useful for carrying current in severe service environments is shown in FIG. 3. The cable is formed by assembling together by any conventional method three of the cables depicted in FIG. 1 around an elastomeric filler 33 consisting essentially of one of the elastomers used in layer 20 described above with respect to FIG. 2. For simplicity of illustration, the adhesive layer is not shown in FIG. 3. Three of the cables shown in FIG. 2 may also be employed in the multi-conductor cable. After the three cables are assembled, a suitable elastomeric covering 34, which may be any of the elastomers used for filler 33, is applied over, vulcanized and bonded to the three cables. Thereafter, a metal layer 35 is applied over layer 34. The metal layer 35 may be any suitable metal such as commercial bronze or steel, consists of helically wrapped metal tape of either the flat or contoured interlocking type, and serves as armor to protect the plurality of cables from physical damage. The number of cables used in such multi-conductor cables can be varied to meet electrical circuit needs, and, for example may be two, four, or more.

A flat, parallel multi-conductor cable useful for carrying current in extreme service environments is shown in FIG. 4. To form the cable, a suitable elastomeric layer 40, consisting essentially of one of the elastomers used in layer 20 discussed above with respect to FIG. 2, is applied over the cable depicted in FIG. 1, vulcanized and bonded thereto by a suitable adhesive. For simplicity of illustration, the adhesive layer is not shown in FIG. 4. Thus, the conductor 1 is surrounded by a layer of polymeric insulation 4 comprising an ethylene-propylene-diene terpolymer, which in turn is covered by an elastomeric jacket 40. As well as this insulated, elastomerically jacketed cable, the cable shown in FIG. 2 may also be used. The three insulated and protected conductors are assembled with the longitudinal axis of each conductor parallel to the other, and are snugly disposed within metal layer 45. The metal layer may be any suitable metal such as commercial bronze or steel, consists of helically wrapped metal tape of either the flat or contoured interlocking type, and serves as armor to protect the plurality of cables from damage. The number of cables used in such multi-conductor cables can be varied to meet electrical circuit needs, and, for example, may be two, four, or more.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:
1. A polymerically insulated electric cable comprising an electrical conductor,
   an adhesive material covering the conductor and consisting essentially of 1.6–5.2% by weight of a chlorinated rubber, 46–54% by weight of an ethylene-propylene-diene terpolymer, 13–19% by weight of a chlorinated triphenyl plasticizer, the remainder being dicumyl peroxide and finely divided carbon, and
   a polymeric insulation material covering the adhesive material and comprising an ethylene-propylene-diene terpolymer.
2. The cable in accordance with claim 1 wherein the polymeric insulation further comprises a surface treated clay, an antioxidant, a stabilizer, a vulcanizing agent, and a curing agent.
3. The cable in accordance with claim 2 wherein the surface treated clay is calcined aluminum silicate and the curing agent is dicumyl peroxide.
4. The cable in accordance with claim 1 wherein adhesive material contains about 0.93–0.98% dicumyl peroxide.
5. The cable in accordance with claim 1 further comprising
   a layer of the adhesive material covering the polymeric insulation material,
   a metal layer covering the layer of the adhesive material,
   a layer of the adhesive material covering the metal layer,
   a protective layer of an elastomeric material covering the layer of the adhesive material.
6. The method of adhering a polymeric insulation to an electrical conductor comprising the steps of:
   mixing 50 to 55% by weight of an ethylene-propylene-diene terpolymer having a Mooney viscosity of 40 after four minutes at 250° F., 14 to 19% by weight of a chlorinated triphenyl plasticizer, 1.0% by weight of a peroxide curing agent and about 30% by weight finely divided carbon in an amount of a solvent, consisting of heptane and toluene in the volume ratio of 1.5:1, sufficient to produce a composition having 13–15% by weight solids,
   diluting the composition with toluene, in the volume ratio of 1:1,
   adding 2.5 to 7.5% by weight of the composition of chlorinated rubber having a viscosity of 19 centipoises,
   applying the adhesive composition to the conductor, and
   covering the adhesive composition with a polymeric insulation material comprising a calcined clay, an antioxidant, a stabilizer, and a peroxide curing agent in an ethylene-propylene-diene terpolymer.

References Cited

UNITED STATES PATENTS

| | | | |
|---|---|---|---|
| 3,436,288 | 4/1969 | Patterson | 117—72 X |
| 3,364,155 | 1/1968 | Souffie | 260—889 X |
| 3,354,107 | 11/1967 | Hamed | 260—889 X |
| 3,096,210 | 7/1963 | Boonstra | 117—216 |
| 3,048,651 | 8/1962 | Howard et al. | 117—120 |

LEWIS H. MYERS, Primary Examiner

A. T. GRIMLEY, Assistant Examiner

U.S. Cl. X.R.

117—110, 120; 156—51; 260—3.5, 33.8